United States Patent
Vide et al.

(10) Patent No.: US 6,289,864 B1
(45) Date of Patent: Sep. 18, 2001

(54) INTAKE MANIFOLD ARRANGEMENT FOR AN INTERNAL COMBUSTION ENGINE

(75) Inventors: Marko-Deja Vide; Reinhard Glanz, both of Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 09/498,071

(22) Filed: Feb. 4, 2000

(30) Foreign Application Priority Data

Feb. 5, 1999 (AT) .................................................. 76/99 U

(51) Int. Cl.⁷ ........................... F02B 31/04; F02M 35/00
(52) U.S. Cl. ........................ 123/184.56; 123/306
(58) Field of Search ..................... 123/184.56, 184.61, 123/251, 306

(56) References Cited

U.S. PATENT DOCUMENTS

| | | | |
|---|---|---|---|
| 4,928,638 | 5/1990 | Overbeck | 123/184.56 |
| 5,165,374 * | 11/1992 | Chapman et al. | 123/308 |
| 5,216,985 | 6/1993 | Brünner et al. | 123/184.56 |
| 5,722,358 * | 3/1998 | Fuesser et al. | 123/184.56 |
| 5,749,342 * | 5/1998 | Chao | 123/184.56 |
| 5,797,365 | 8/1998 | Kim | 123/184.56 |
| 6,105,545 * | 8/2000 | Breidenbach | 123/184.56 |

FOREIGN PATENT DOCUMENTS

| | | |
|---|---|---|
| 3141880 | 5/1983 | (DE) . |
| 4016728 | 11/1991 | (DE) . |
| 0521921 | 7/1994 | (EP) . |
| 6128715 | 2/1986 | (JP) . |

* cited by examiner

Primary Examiner—Noah P. Kamen
Assistant Examiner—Hai Huynh
(74) Attorney, Agent, or Firm—Dykema Gossett PLLC

(57) ABSTRACT

The invention relates to an intake manifold arrangement for an internal combustion engine, in particular for a direct injection diesel oil combustion engine, with at least one region with an intake manifold having a flexible manifold wall, with the flexible manifold wall being formed by an inflatable element. In order to achieve a control of the swirl in the easiest possible manner without having a disadvantageous effect on the intake flow it is provided that the inflatable element is arranged in a recess of the intake manifold wall.

13 Claims, 3 Drawing Sheets

INTAKE MANIFOLD ARRANGEMENT FOR AN INTERNAL COMBUSTION ENGINE

BACKGROUND OF THE INVENTION

The invention relates to an intake manifold arrangement for an internal combustion engine, in particular for a direct injection diesel oil combustion engine, with at least one zone with an intake manifold having a flexible manifold wall, with the flexible manifold wall being formed by an inflatable element which is connected with a pressure supply line.

DESCRIPTION OF THE PRIOR ART

From EP 0 521 921 B1 an intake arrangement for an internal combustion engine is known with gas intake manifolds which produce a tumble flow in the combustion chamber. The tumble flow is produced by an inflatable element provided at one wall of each of the respective intake manifolds. In the evacuated state of the element the intake flow of the element can pass freely. In the inflated state the intake flow is deflected in order to change the direction of the gas flow in the sense of the tumble flow. For this purpose it is necessary to guide the inflatable element relatively far into the flow, thus having a disadvantageous effect on the flow, however. An influence on the axial swirl is not intended.

U.S. Pat. Nos. 5,216,985 and 4,928,638 A each describe intake manifold arrangements for internal combustion engines in which the manifold cross section and thus the flow speed can be changed by an inflatable membrane. Fuel consumption can be improved by changing the flow speed.

From the Japanese published application no. 61-28 715 an intake manifold arrangement for an internal combustion engine is known in which a pipe ending in the zone of the valve seat is arranged in the centre in the intake manifold so as to control the swirl. An inflatable membrane is arranged in the inlet zone of the pipe around the same, thus enabling the control of the flow through the pipe and thus of the swirl.

From DE 40 16 728 A1 a device for controlling the swirl is known which is formed by a valve seat ring with an inflatable swirl insert.

These known elements for controlling the swirl have the disadvantage that they influence the flow to a relatively high extent even in the idle state and thus have an adverse effect on the flow rate.

Moreover, an internal combustion engine is known from DE 31 41 880 A1 in which the tongue length of the spiral manifold and thus the intake swirl can be changed by an inflatable hollow body. Since the tongue area in the spiral manifold is the location where the smallest changes of shape and position lead to the largest effects on the swirl, even minimal changes in regulating pressure have a strong effect on the swirl. Due to this sensitivity a stable engine state that can repeatedly be set can only be realized with difficulty. Apart from that, the system can only be produced with high expenditure.

SUMMARY OF THE INVENTION

It is the object of the present invention to avoid such disadvantages and to improve an intake manifold arrangement of the kind mentioned above in such a way that in particular the axial intake swirl can repeatedly be adjusted and controlled without any major negative effects on the flow rate.

This occurs in accordance with the invention in such a way that the inflatable element is arranged in a recess of the intake manifold wall. In this way the shape of the manifold can be changed dynamically without having a negative influence on the flow rate in engine operation. It can be provided that the flexible manifold wall is provided in at least one position with an arrangement extending steadily with the ambient rigid manifold wall. In order to avoid flow impairments such as separation phenomena it is particularly favorable if the element is substantially adapted to the shape of the intake manifold both in the inflated as well as the deflated state.

It is provided for in a preferable embodiment that the inflatable element can optionally be pressurized by way of a pressure supply line, which pressure is either equal to or higher or lower than the pressure in the intake manifold. The inflatable element can be provided both with an inflatable as well as evacuatable arrangement. A middle position of the element can correspond to the unimpaired originally cast shape of the manifold.

It is provided for in a particularly simple embodiment that the inflatable element is substantially arranged as a membrane. As an alternative it is possible to arrange the inflatable element as a cushion.

It is particularly preferable if the recess receiving the elastic element is arranged substantially annularly and is preferably arranged so as to encircle the elastic element. It is preferably provided that the elastic element comprises several chambers which can preferably be pressurized independently from one another.

In a particularly preferable embodiment of the invention it is provided that the intake manifold can be closed off at least partly by the inflatable element, with the inflatable element preferably forming a throttle for the intake manifold. This embodiment is particularly favorable when at least two intake manifolds are present per cylinder which can be arranged as spiral and/or tangential manifold. If a tangential manifold is present, a more or less complete closure of the tangential manifold can be achieved by one or several inflatable elements.

If a control of the axial swirl flow is especially desired, it is advisable to arrange the inflatable element in the zone of the opening into the cylinder.

Plastic such as Teflon can be used as a material for the inflatable element, with the plastic being reinforced with fibers having a directed structure so as to achieve a high tensile strength. In this way a microstructure such as longitudinal grooves on the surface can be realized.

BRIEF DESCRIPTION OF THE DRAWINGS

The invention is now explained in closer detail by reference to the enclosed figures, wherein.

Components with the same function are provided in the embodiments with the same reference numerals.

DETAILED DESCRIPTION OF THE PREFERRED EMBODIMENTS

Figure 1:
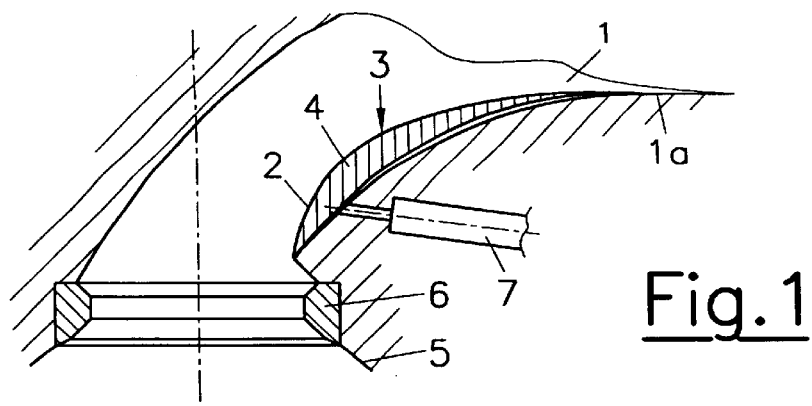
FIG. 1 shows a first embodiment of the invention in a tangential manifold in an elevation according to line I—I in FIG. 2.
Figure 2:
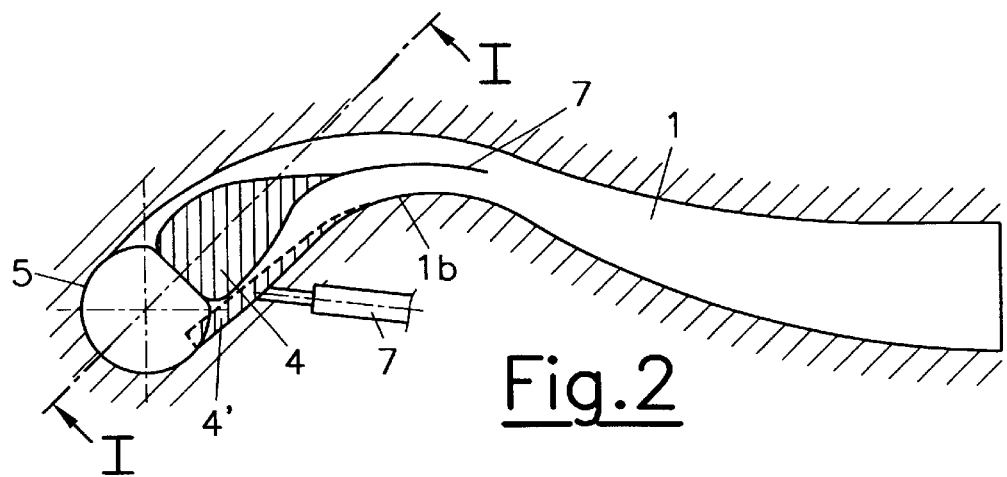
FIG. 2 shows said tangential manifold in a plan view.

An internal combustion engine is provided with an intake manifold arrangement with at least one intake manifold 1 per cylinder. The intake manifold 1 is provided with at least one region 2 with a flexible manifold wall 3 which is formed by an inflatable element 4. FIGS. 1 and 2 show an elevation and plan view of an intake manifold arranged as a tangential manifold. In order to achieve an influence on the swirl flow the inflatable element 4 is arranged in the floor region 1a of the intake manifold 1. As an alternative or in addition thereto, an inflatable element 4' can be arranged in the region of side wall 1b of intake manifold 1. Reference numeral 5 designates the opening into the combustion chamber which is not illustrated in further detail, with a valve seat ring 6 being provided in the orifice region of intake manifold 1. The inflation and evacuation of the element 4 occurs via a pressure supply line 7, with the filling medium being either gaseous or hydraulic.

Figure 3:
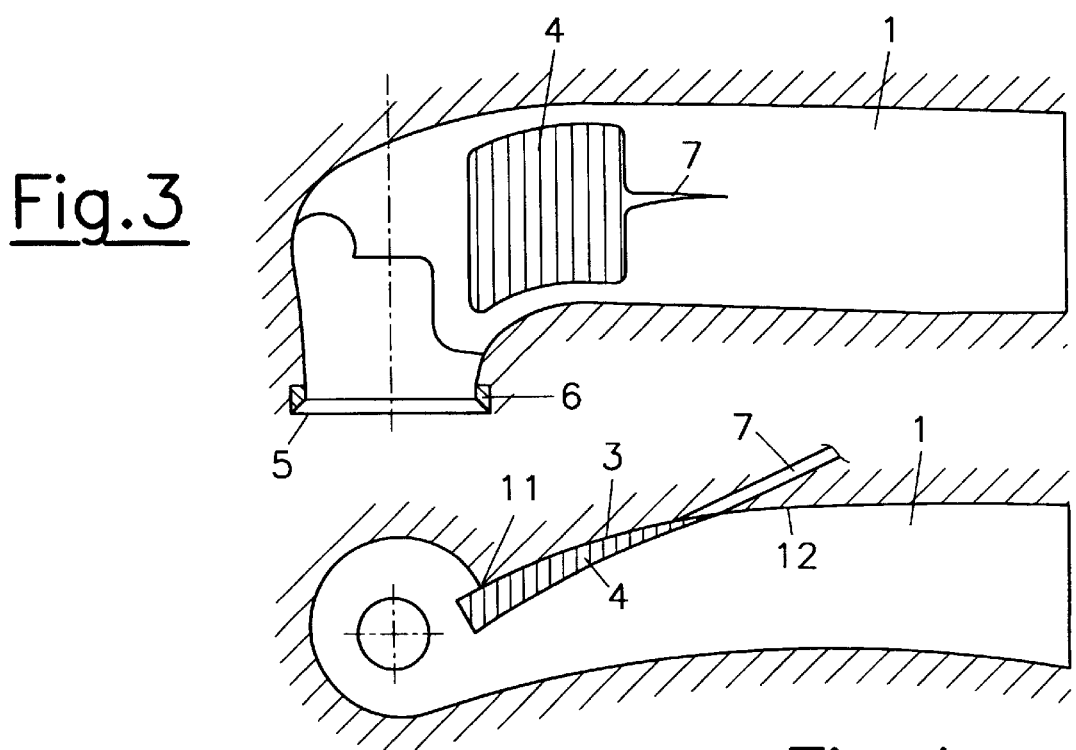
FIG. 3 shows an intake manifold arrangement arranged in accordance with the invention in a spiral manifold in an elevation.
Figure 4:
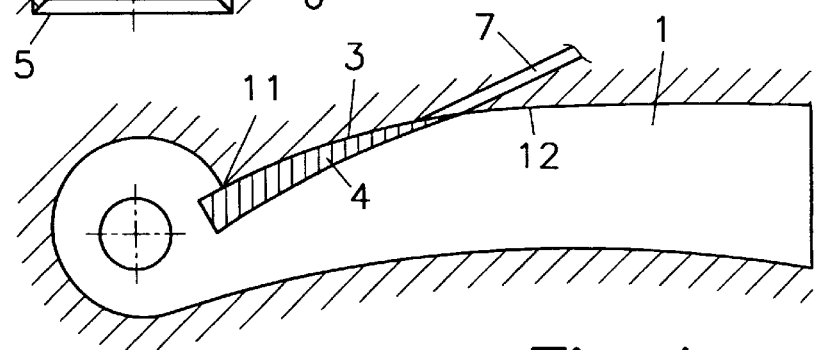
FIG. 4 shows said spiral manifold in a plan view.

FIGS. 3 and 4 show an elevation and a plan view of an intake manifold 1 arranged as a spiral manifold, with a flexible intake manifold wall 3 being provided in the region of the spiral tongue 11, which wall is formed by an inflatable element 4. The swirl can be influenced in a purposeful manner by inflating or evacuating the inflatable element 4.

Figure 5:
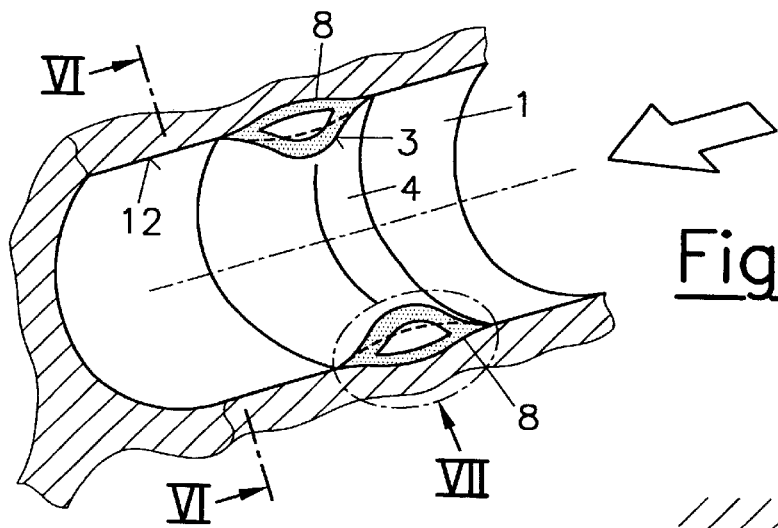
FIG. 5 shows an oblique view of an intake manifold designed in accordance with the invention.
Figure 6:
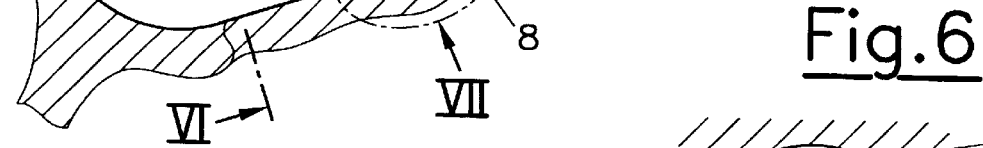
FIG. 6 shows a manifold cross section in accordance with line VI—VI in FIG. 5.
Figure 7:
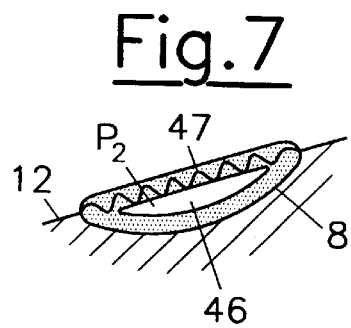
FIG. 7 shows the detail VII of the intake manifold of FIG. 5 in a sectional view.
Figure 8:
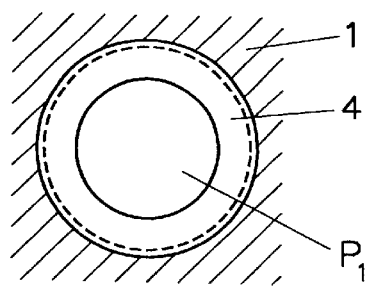
FIG. 8 shows an intake manifold in a fourth embodiment in a sectional view in analogy to FIG. 6.

In order to influence the intake flow in a neutral position as little as possible, the inflatable element 4 is arranged in a respective recess 8 of the intake manifold 1, 10, as is illustrated in particular in FIGS. 5, 7, 9 and 11 through 15c. The recess 8 is formed by a cavity in the wall of the intake manifold. FIG. 5 shows an arrangement in which the recess 8 in the intake manifold 1 is annular. This is particularly favorable when the inflatable element 4 is to assume the function of a scaling or throttling device. In this case elastic the element 4 can per se also be arranged as a ring, as is indicated in FIG. 6, or it can be provided with several inflatable chambers 4a, 4b, 4c which can be activated simultaneously or independent from one another (FIG. 8). The inflatable element 4 can be made of fiber-reinforced plastic. In FIG. 7 the respective fiber tissue is designated with reference numeral 47.

Figure 9:
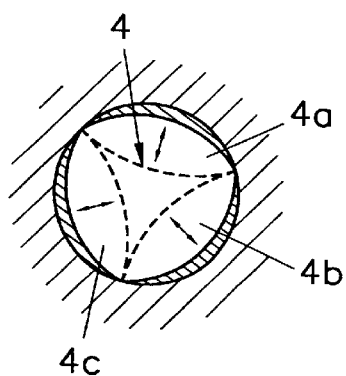
FIG. 9 shows a detail of an intake manifold designed in accordance with the invention in an oblique view with a dismounted inflatable element.
Figure 10:
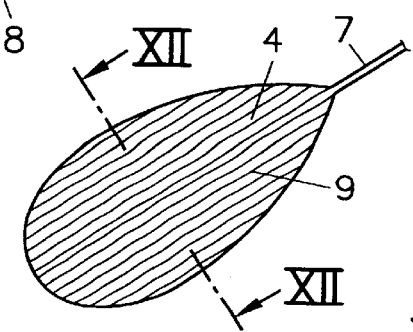
FIG. 10 shows an inflatable element of said intake manifold in a top view.

FIG. 9 shows an embodiment of an intake manifold 1 for a cushion-like inflatable element 4 with an oval recess 8, with the element 4 being dismounted. The depth T of the recess 8 is approx. 1 mm. FIG. 10 shows the respective inflatable element 4 made of fiber-reinforced plastic. The fibers can be provided with a directed structure, thus enabling an increase of the tensile strength in one direction. The fibers also allow forming a surface of element 4 with longitudinal grooves or a microstructure 9 (FIG. 10).

Figure 11:
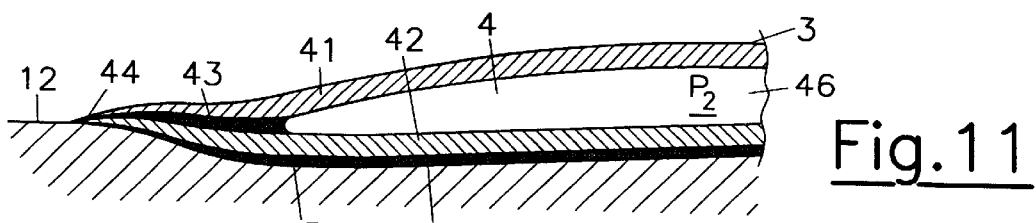
FIG. 11 shows an inflatable element in a sectional view in an embodiment.

FIG. 11 shows the principal structure of an inflatable element 4 in a sectional view in an embodiment. Said inflatable element 4 is arranged as a double cushion enclosing a hollow chamber 46 and provided with a cover layer 41 and a base layer 42, with the cover layer 41 and the base layer 42 being connected with adhesive 43. The edges 44 are arranged so as to extend with the ambient rigid manifold wall 12.

Figure 12:
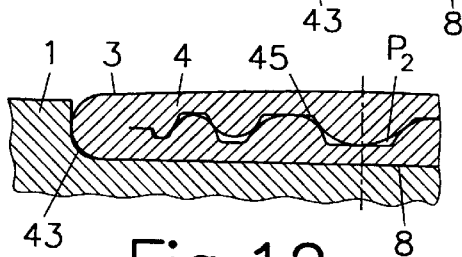
FIGS. 12 and 13 show an inflatable element in accordance with the invention in another embodiment, according to the sectional view XII—XII in FIG. 10.
Figure 13:
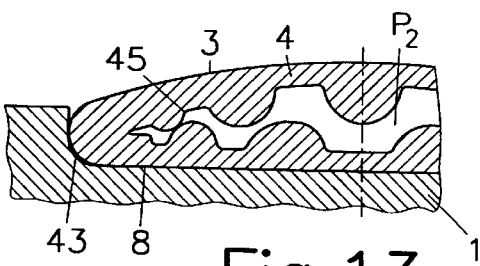

FIGS. 12 and 13 show an embodiment show an embodiment of an inflatable element 4 which is provided with a profile 45 and is shown in the evacuated state (FIG. 12) and in the inflated state (FIG. 13). Element 4 is fixed in the recess 8 of the intake manifold 1 by way of an adhesive layer 43.

Figure 14A:
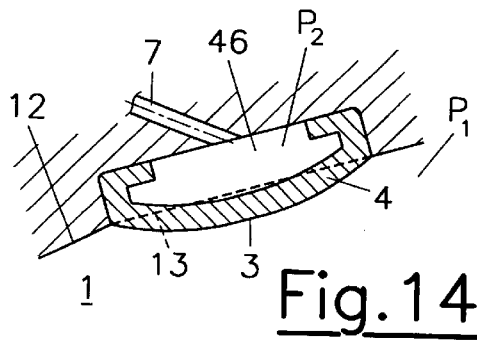
FIGS. 14a, 14b, 14c show a further embodiment of an inflatable element in three different positions.
Figure 14B:
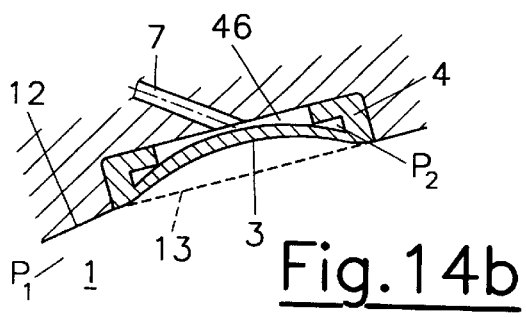
Figure 14C:
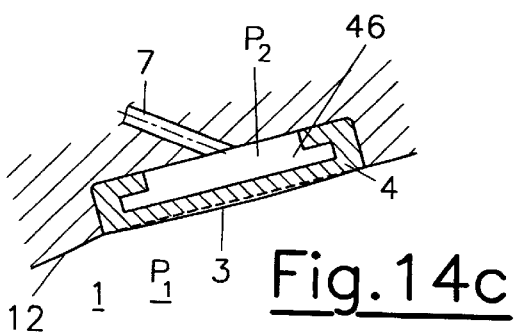

FIGS. 14a, 14b, 14c show an embodiment of an element 4 which is arranged as a membrane. The original shape of the intake manifold is indicated with the broken line 13. In the position of element 4 as illustrated in FIG. 14a the pressure $P_2$ in the hollow chamber 46 of element 4 on the side of the membrane which is averted from the intake manifold 1 is higher than the pressure $P_1$ in the intake manifold 1, which is why the intake element 4 will bulge in the direction towards intake manifold 1. In FIG. 14b the pressure $P_2$ is lower than pressure $P_1$ and the inflatable element will thus be evacuated. A highly effective influence on the swirl can thus be achieved. FIG. 14c shows a neutral position in which the pressure $P_1$ is approximately equal to the pressure $P_2$.

Figure 15A:
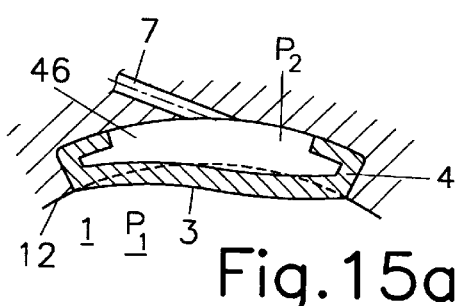
FIGS. 15a, 15b and 15c show another embodiment of an inflatable element in a sectional view in three different positions.
Figure 15B:
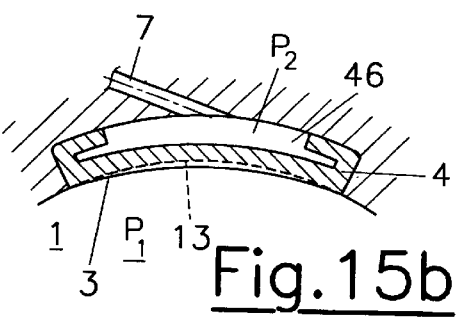
Figure 15C:
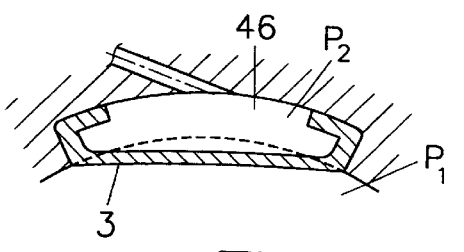

FIGS. 15a to 15c show a further embodiment of an elastic element 4 arranged as a membrane, with the broken line 13 again indicating the original shape of the manifold. In FIG. 15a the pressure $P_2$ within the elastic element is higher than the pressure $P_1$ in the intake manifold 1, which is why the elastic element 4 bulges in the direction towards intake manifold 1. In FIG. 15b the pressure $P_2$ in the hollow chamber 46 within the elastic element 4 is lower than the pressure $P_1$ outside of the elastic element, which is why the same is slightly evacuated. The course of the flexible intake manifold 3 as formed by the elastic element 4 substantially corresponds to the original shape of the manifold 13. FIG. 15c shows a position of the elastic element 4 in which approximately the same pressure $P_2$ prevails within the elastic element 4 as outside of element 4. The course of the flexible manifold wall 3 is offset from the original shape of the manifold 13 in the direction towards intake manifold 1.

What is claimed is:

1. An intake manifold arrangement for an internal combustion engine, in particular for a direct injection diesel oil combustion engine, with at least one region with an intake manifold having a flexible manifold wall, with the flexible manifold being formed by an inflatable element which is connected with a pressure supply line, wherein the inflatable element is arranged in a recess of the intake manifold wall.

2. An intake manifold arrangement according to claim 1, wherein the flexible manifold wall is provided in at least one position with an arrangement extending steadily with the ambient rigid manifold wall.

3. An intake manifold arrangement according to claim 1, wherein the inflatable element can optionally be pressurized via a pressure supply line with a pressure which is equal to or higher or lower than the pressure in the intake manifold.

4. An intake manifold arrangement according to claim 1, wherein the recess receiving the inflatable element is arranged substantially annularly and preferably encircling the elastic element.

5. An intake manifold arrangement according to claim 1, wherein the inflatable element is provided with several chambers.

6. An intake manifold arrangement according to claim 1, wherein the inflatable element is substantially adjusted to the shape of the intake manifold both in the inflated as well as evacuated state.

7. An intake manifold arrangement according to claim 1, wherein the intake manifold can at least partly be closed off by the inflatable element.

8. An intake manifold arrangement according to claim 7, wherein the inflatable element forms a throttle for the intake manifold.

9. An intake manifold arrangement according to claim 1, wherein the inflatable element is arranged in the zone of the opening into the cylinder.

10. An intake manifold arrangement according to claim 1, wherein the inflatable element is made of plastic.

11. An intake manifold arrangement according to claim 10, wherein the plastic material of the inflatable element is fiber-reinforced.

12. An intake manifold arrangement according to claim 1, wherein the inflatable element is arranged as a cushion.

13. An intake manifold arrangement according to claim 1, wherein the inflatable element is substantially arranged as a membrane.

* * * * *